Dec. 1, 1959  O'FARREL ABENDROTH  2,915,127
FLUID CONTROLLED JUNK BASKET
Filed March 29, 1956  4 Sheets-Sheet 1
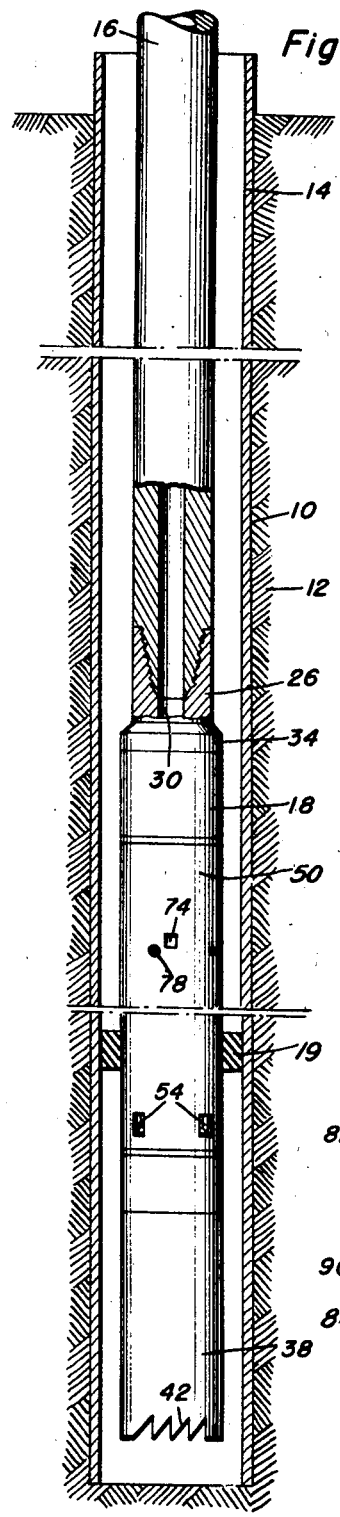
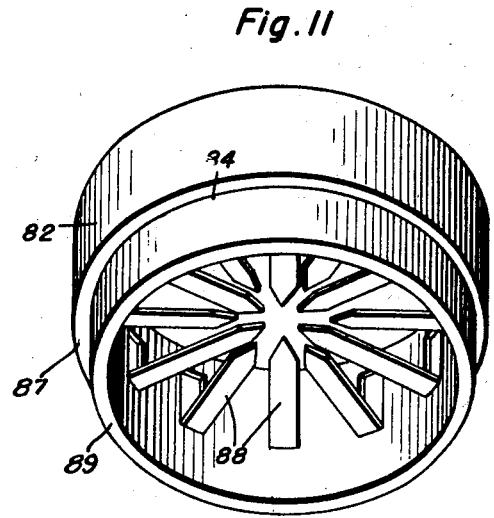
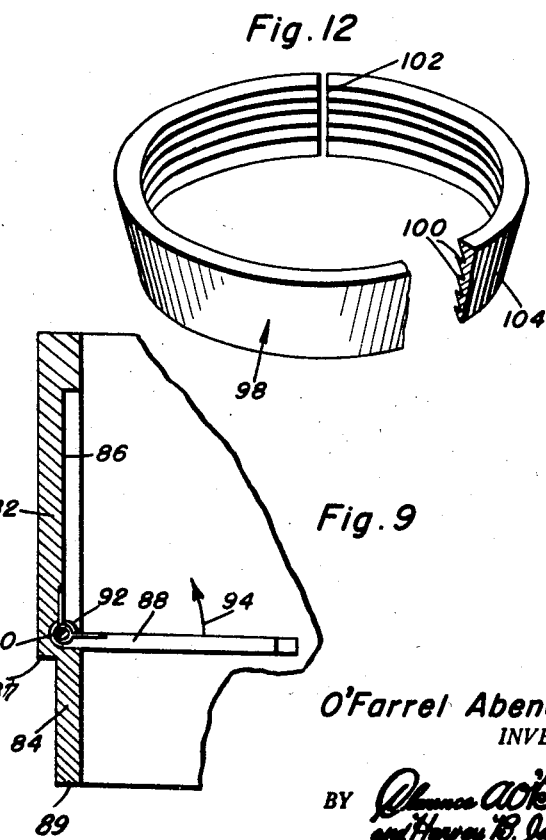
O'Farrel Abendroth
INVENTOR.

Dec. 1, 1959  O'FARREL ABENDROTH  2,915,127
FLUID CONTROLLED JUNK BASKET
Filed March 29, 1956  4 Sheets-Sheet 2

O'Farrel Abendroth
INVENTOR.

BY *[signatures]*
Attorneys

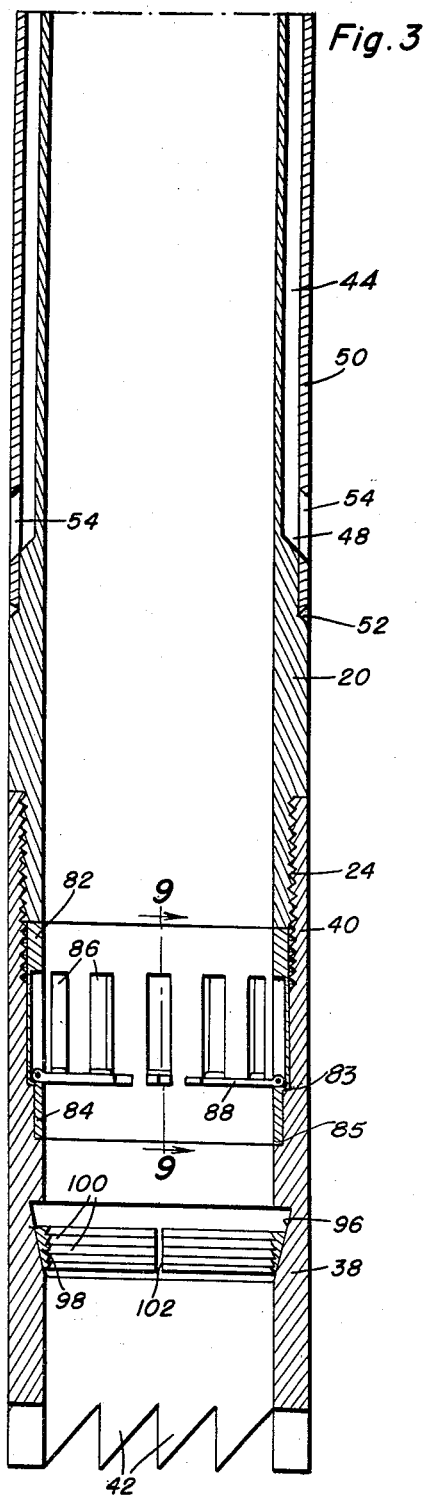
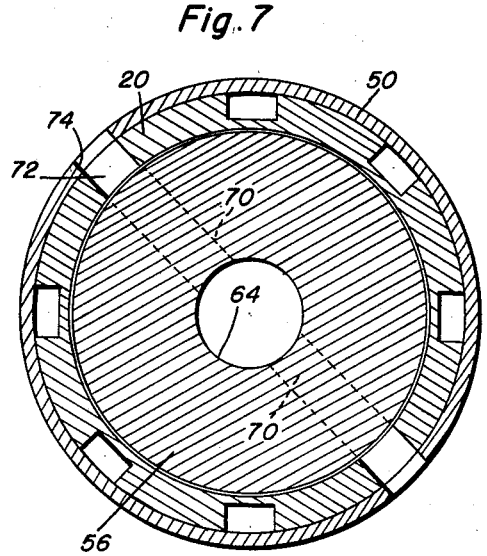
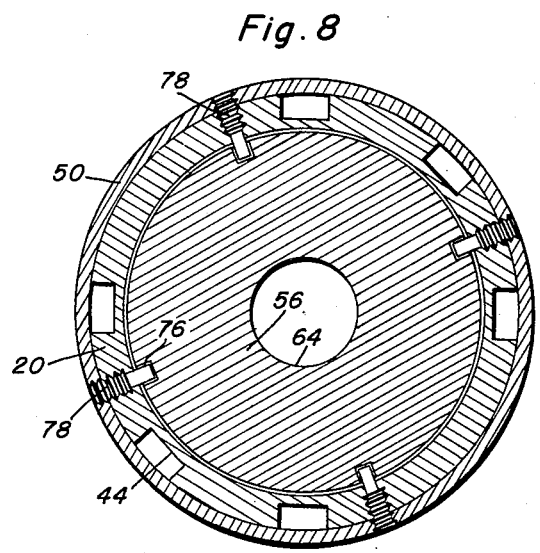

Dec. 1, 1959 — O'FARREL ABENDROTH — 2,915,127
FLUID CONTROLLED JUNK BASKET
Filed March 29, 1956 — 4 Sheets-Sheet 4

O'Farrel Abendroth
INVENTOR.

United States Patent Office 2,915,127
Patented Dec. 1, 1959

2,915,127

FLUID CONTROLLED JUNK BASKET

O'Farrel Abendroth, Bossier City, La.

Application March 29, 1956, Serial No. 574,911

12 Claims. (Cl. 166—99)

This invention relates to a fluid controlled junk basket, and more particularly is directed to a fishing tool adapted for use in well bores for recovering junk therefrom with a superior and more efficient action.

The principal object of this invention is to provide a fishing tool which will permit normal circulation of fluid through the string to which the tool is attached during the passage of the tool into a well bore, and wherein automatic means are provided for causing reverse flow of fluid from the string to which the tool is attached and through the junk basket or junk collecting chamber of the tool.

A further object of the invention is to provide a fishing tool having a greatly improved reverse flow passage arrangement therein.

Yet another object of the invention is to provide a fishing tool in accordance with the preceding objects which shall include a core slip for effectively gripping and retaining a core or similar object in the collecting chamber or barrel of the tool.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a view in vertical central section through a well bore, parts being broken away and other parts of the tool being shown in vertical section, and illustrating a fishing tool attached to the end of a drill string in accordance with this invention;

Figure 3 is an enlarged view in vertical section of the lower portion of the fishing tool, this view, together with that of Figure 2, showing the complete tool in vertical central section;

Figure 7 is a detail view, taken upon an enlarged scale, and in horizontal section substantially upon the plane indicated by the section line 7—7 of Figure 4, the reverse flow passages in the valve body of the tool being shown in dotted lines therein;

Figure 8 is a detail view, taken upon an enlarged scale and in horizontal section substantially upon the plane indicated by the section line 8—8 of Figure 6 and showing in particular the guide and stop means of the valve body and casing of the tool;

Figure 9 is a detail view taken upon a considerably enlarged scale and in vertical section substantially upon the plane indicated by the section line 9—9 of Figure 3, and showing in particular the disposition of the fingers of the catcher assembly with respect to the catcher body and the chamber of the junk basket;

Figure 11 is a perspective view of the junk basket and catcher finger assembly of the tool;

Figure 12 is a perspective view, parts being broken away, of a resilient core slip forming a part of the tool.

Figure 2:
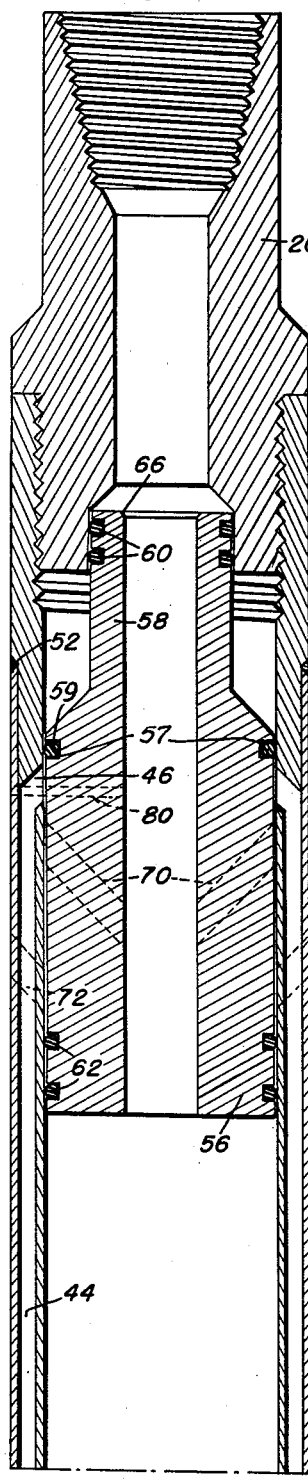
Figure 2 is an enlarged view in vertical central section of the upper portion of the fishing tool, certain concealed reverse flow passages being shown in dotted lines therein, the parts being shown in their inoperative position when the tool is being lowered into position in a well bore.

Referring now more specifically to the accompanying drawings, it will be observed that Figure 1 designates by the numeral 10 a well bore extending into a subterranean formation 12, a conventional well casing 14 being inserted into the bore as a liner therefor. The lower end of a drilling string 16 extends into this bore, and during drilling operations it is customarily provided with a drilling bit for extending the bore downwardly through the formation. When it is desired to recover objects from the well bore, as, for example, broken drill portions, broken drill stems, or other junk, the novel fishing tool and junk basket assembly of this invention, and which is designated generally by the numeral 18, is applied to the lower end of the drilling string 16.

Referring now specially to Figures 2–6, it will be apparent that the fishing tool 18 consists of a cylindrical barrel or casing member 20 which is internally threaded at 22 at its upper end and is externally threaded at 24 at its lower end.

A coupling or connecting member consisting of a tubular body 26 is provided which at its upper end is provided with a tapered, internally threaded portion 28 adapted to receive the pin projecting from the end of a section of the drilling string 16 as will be apparent from Figure 1. The connecting member 26 is provided with an axial bore or passage 30 therethrough which thus continues to communicate with the interior of the drilling string 16, while the lower end of the connector body is provided with an enlarged cylindrical axial bore or chamber 32 whose upper end communicates with the bottom of the passage 30. By means of a shoulder 34 and the externally threaded portion 36, the connector 26 is engaged in the internal threads 22 of the barrel 20 of the fishing tool.

As so far described, it will be apparent that the upper end of the fishing tool is thus in communication with the interior of the drilling string whereby fluid, such as drilling mud, or the like may be continuously supplied to the interior of the fishing tool as set forth hereinafter.

As shown best in Figure 3, a cylindrical barrel or sleeve 38 constituting a junk basket is provided with an internally threaded upper end 40 which is detachably secured to the externally threaded lower portion 24 of the upper barrel or section 20 of the fishing tool. At its open lower end, the barrel 38 may be provided with the conventional drill teeth 42 whereby the entire tool may be rotated by the drilling string to continue the drilling operation in furtherance with the function of the tool, whereby the barrel 38 may also constitute a mill shoe.

Figure 10:
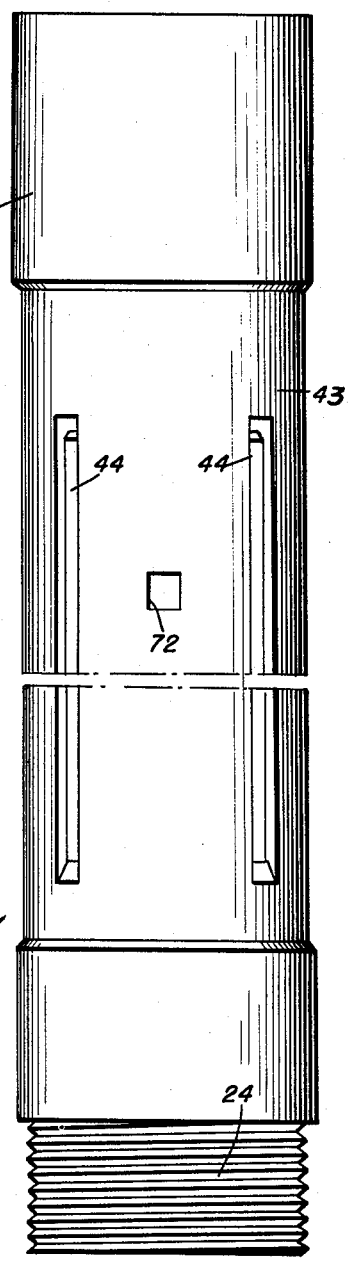
Figure 10 is an elevational view, parts being broken away, of the fishing tool in accordance with this invention, an outer sleeve or casing member being removed therefrom to show the reverse circulation passage means of the barrel of the tool.

Referring now especially to Figure 10, it will be seen that the exterior surface of the barrel 20 is recessed or diametrically reduced to provide a cylindrical surface 43. A plurality of appropriately positioned, longitudinal channels 44 are provided in the surface 43, the channels at their upper end having ports 46 opening into the interior of the barrel, as will be apparent from Figures 2 and 4, while the lower ends of these channels have outwardly opening ports 48 as shown in Figure 3. It will be understood that any desired number of these channels and an appropriate positioning and location of the same for the purpose set forth hereinafter will be provided.

A cylindrical sleeve 50 is positioned upon the reduced surface 42, as will be seen from Figures 2–8, this sleeve serving to enclose the channels 44 and thus form passage means of the same. The sleeves are secured, as by welding or the like, as suggested at 52, and form smooth continuations of the cylindrical exterior surface of the fishing tool. At the ports 48, the sleeve is provided with registering discharge ports 54.

Slidably received within the barrel is a cylindrical body 56 constituting a valve which performs a number of functions. The upper end of the valve body is provided with a diametrically reduced extension or neck 58 which is of sufficient diameter to be snugly received within the enlarged portion 32 of the bore 30 in the member 26, as will be evident from a comparison of Figures 2 and 6. Upper and lower sets of O-rings 60 and 62, respectively, are provided in circumferential grooves in the neck 58 and the lower portion of the body 56 for establishing a fluid-tight sealing engagement with the walls of the enlarged bore portion 32 and the interior of the barrel 20. An axial bore or passage 64 extends entirely through the valve body whereby continuous communication is established between the hollow interior of the drill string to which this tool is applied and to the lower interior portion of the tool, except as closed by a means to be subsequently set forth.

Figure 4:
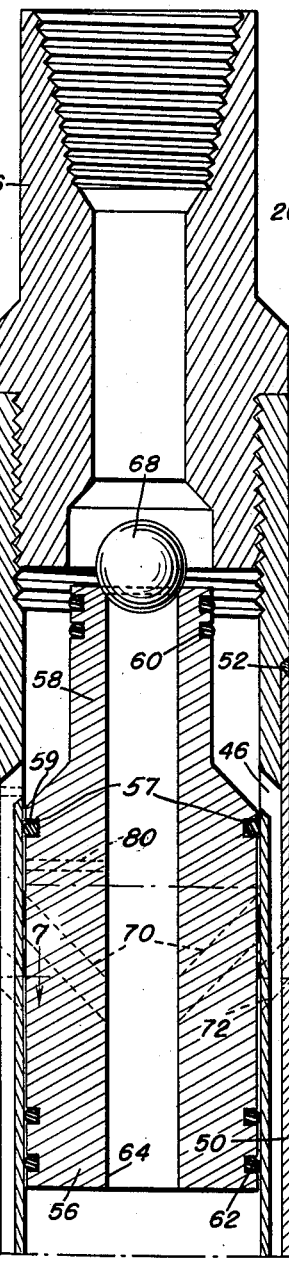
Figure 4 is a view similar to Figure 2 but showing the position of the parts after the tool has been placed in position in the well bore and the valve body of the tool has started movement from its inoperative position to its position for causing reverse circulation of fluid through the junk collecting chamber of the tool.
Figure 5:
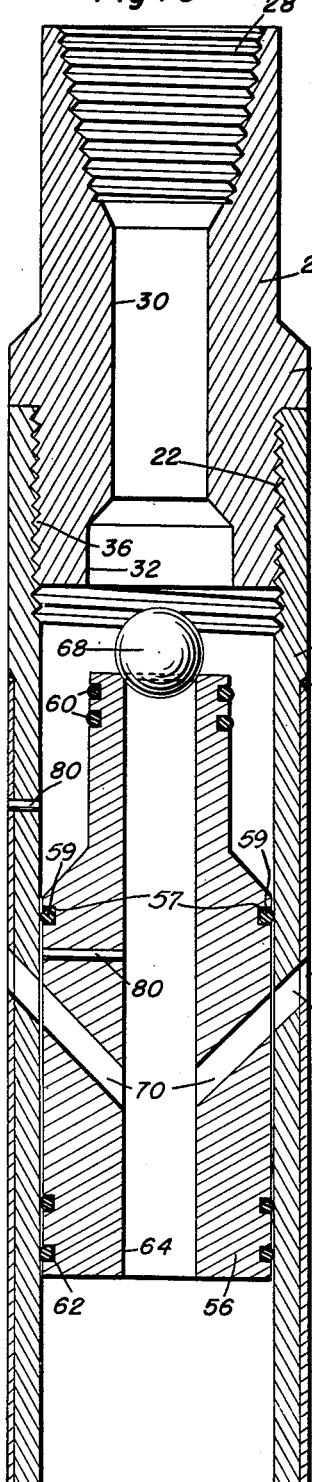
Figure 5 is a view similar to Figure 2 but taken on a vertical plane through the reverse flow ports and valve passages of the tool, and showing the valve body in its final position for effecting reverse circulation through the junk basket or collecting chamber of the tool.
Figure 6:
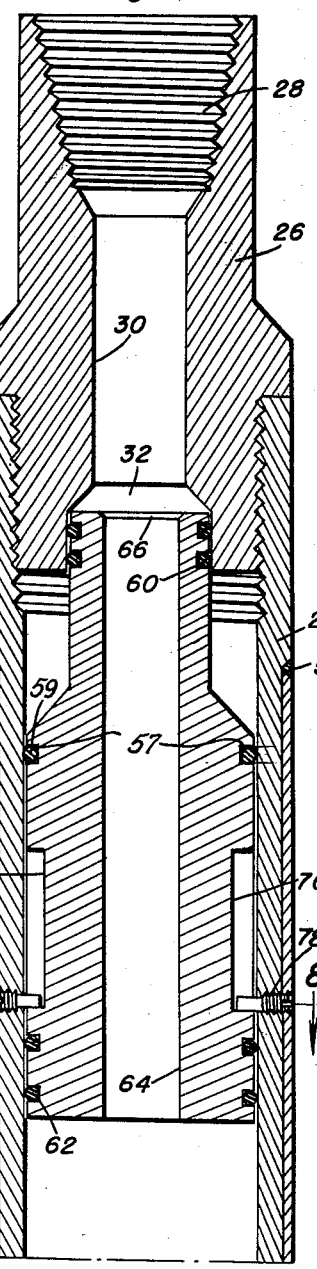
Figure 6 is a view similar to Figure 2 but taken upon a vertical plane through the guide and stop means of the movable valve body, the latter being shown in its raised or inoperative position as shown in Figure 2.

As will be most readily apparent from Figures 2 and 6, the upper portion of the valve neck 58 is provided with a seat 66 which is adapted to be closed as by a ball valve 68 when the latter is dropped down through the interior of the drill string and passage 32 onto the seat 66 at the upper end of the passage extending through the valve body. When this ball has been dropped upon the seat 66, it will be seen that the passage through the valve is cut off from the space above the valve, as shown in Figures 4 and 5, at which time the valve functions as a solid member or piston under the influence of fluid pressure, as set forth hereinafter.

A plurality of circulation passages 70 extend from the axial bore 64 of the valve body to the exterior thereof, in such position as to register with corresponding ports 72 and 74 in the barrel 20, see Figures 5 and 7, and in the member 50 when the valve is in its lowermost position as shown in Figure 5. In any other position of the valve body, however, the passages 70 are out of registration with these ports, as will be apparent from the dotted line showings of Figure 2 and 4.

The upper portion of the piston body 56 just below the junction of the neck 58 therewith has a circumferential groove 57 receiving an O-ring or other conventional seal 59 therein which prevents any leakage of fluid into the ports 72 past the piston body.

Figure 13:
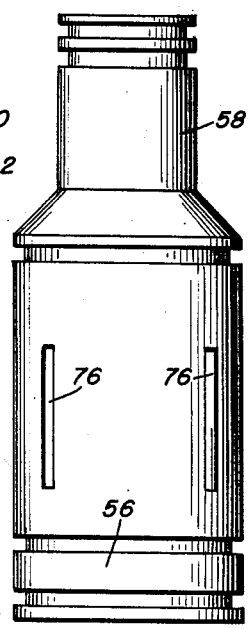
Figure 13 is an elevational view of the valve body of the tool, the sealing rings being omitted therefrom.

A combined guide and stop means is provided for limiting the vertical reciprocation of the valve body within the barrel 20 and also for preventing rotation of the valve therein, in order to insure proper registration of the passages 70 with the ports 72 and 74. This stop and guide means as shown best in Figures 6 and 13 consists of a plurality of appropriately circumferentially spaced and longitudinally extending channels or guide grooves 76 in the body 56, together with screw threaded guide pins 78 which extend through the sleeve 50 and the barrel 20 into sliding engagement in the guide channels 76. These pins thus limit vertical reciprocation of the valve body in the barrel 20, while at the same time preventing relative rotation of the valve body with respect to the barrel and the ports therein.

A shear pin is provided to retain the valve in its raised position of Figures 2 and 6 until it is desired to lower the valve. For this purpose, there is thus provided a pin 80 which extends through the sleeve 50, the barrel 20 and into the valve body 56 to thereby retain the valve in its raised position, as shown particularly in Figure 2, until the pin is sheared. After the shearing of this pin, the valve is then free to travel downwardly in a manner to be subsequently set forth.

Referring now especially to Figures 3, 9, 11 and 12, it will be seen that the lower section of the tool comprises both a junk basket having catcher fingers therein, together with a core slip. The junk basket portion comprises a cylindrical bushing or sleeve 82 having a diametrically reduced lower portion 84. The interior of the member 38 is recessed to provide a snug seat for these members as will be apparent from Figure 3. The lower end of the threaded portion 24 of the barrel 20 engages the upper edge of the sleeve 82 and thus forces the latter downwardly to a snug engagement upon the seat surfaces provided in the barrel 20 by the shoulders 83 and 85, Figure 3, which are engaged by the annular surfaces 87 and 89 of the members 82, 84, see Figures 9, 11.

A plurality of longitudinal grooves or recesses 86 are provided in the interior surface of the sleeve 82 and each of these grooves receives a catcher finger 88 which is secured as by a pivot pin 90 to the sleeve 82 and in the grooves 86 for vertical pivoting movement therein. Coil springs 92 may be provided for each of these pivot pins to yieldingly urge the fingers 88 into their horizontal or lowered position, as shown in Figures 3, 9 and 11. However, the arrangement is such that the fingers may be forced upwardly in the direction indicated by the arrow 94 of Figure 9 as a core or other object is forced into the junk basket as the tool moves downwardly over such object. The recesses 86 provide a clearance whereby the fingers may be folded completely flush with or recessed into the cylindrical internal surface of the sleeve 82, when desired.

Below the junk basket, the member 38 is provided with a tapered, downwardly convergent annular groove 96, which is adapted to receive a resilient annular ring 98, see Figure 12, provided with internal annular ribs or teeth 100, this ring having a split portion as at 102. The exterior surface 104 of this ring is tapered in a manner complementary to that of the groove 96. This arrangement is such that the natural resiliency of the ring will tend to expand the same and thus cause the ring to normally seat in the upper diametrically larger portion of the tapered channel 96. In this position, the teeth 100 of the slip will thus be recessed into or inwardly of the cylindrical interior surface of the member 38 and thus cause little resistance to upward passage of a core into the lower end of the tool and into the junk basket. However, as soon as the tool is lifted, the engagement of the slip teeth 100 with the core will tend to cause the ring to move relatively downwardly in its seat 96, and the cooperating tapered surfaces of the slip ring and of the seat will cause a radial contraction of the ring, thereby more tightly gripping and securely holding the core. Thus, a core may be effectively retained by this tool for removal therewith from a well bore.

The operation of this junk basket with its reverse circulating system is as follows: With the tool connected to the lower end of a drill string or a tool string by the connector 26, and the valve body retained in its raised position by the shear pin 80 as indicated in Figures 2 and 6, the tool string together with the junk basket is lowered into the well casing or bore while a normal circulation of fluid is maintained downwardly through the string, through the passages 30 and 64, and from thence downwardly through the junk basket and out the bottom of the mill shoe, this flow assisting in the operation of the teeth 42 as the device is caused to penetrate deeper into the bottom of the well bore, the fluid returning to the surface upon the exterior of the tool string.

It will be observed that in this normal circulation of the fluid, the flow is downwardly through the interior of the junk basket, the fluid emerging from the bottom of the mill shoe and thence passing upwardly outside of the junk basket. When it is desired to place the junk basket in operation, the ball valve 68 is dropped downwardly through the tool string, and by its weight alone, or assisted by the flow of the circulating fluid lodges upon the seat 66, thereby closing flow through the passage 64. Since the rings 60 are sealed in the bore 32, the full pressure of the fluid is now applied to the upper surface of the valve body, until this pressure is sufficient to cause shearing of the pin 80. At this time, the valve is now free to move downwardly from the position shown in Figure 6, until the upper portion of the groove 76 engages the stop and guide pin 78 to thus prevent further downward movement of the valve body. During the initial portion of this downward movement, the neck 58 of the valve body moves out from the bore 32, as shown in Figure 4, whereby the fluid is free to pass into the barrel surrouding the neck 58, until the neck moves downwardly a sufficient distance to permit this fluid to enter the reverse circulation passages 44 after inlet ports 46 thereof are uncovered by the body 56. This intermediate position of the valve is shown clearly in Figure 4. As soon as the fluid enters the passages 44, it is free to emerge from the continuously open lower ends of these passages by way of the exit ports 54, as will be apparent from Figure 3. The fluid now is diverted from the interior of the junk basket to the exterior of the same, and thus flows into the well bore at about the lower portion of the tool. As the valve body continues to move downwardly from the position of Figure 4, until the stop pins engage the upper ends of the channel 76, this being the position shown in Figure 5, the return passages 70 in the valve body register with the return ports 74 and 72. At this time, the fluid flowing downwardly through the reverse circulation passages 44 and emerging from the exhaust ports 54 enters the lower end of the mill shoe, then passes upwardly inside the junk basket, then up through the valve bore 64, and then by means of passages 70 and ports 72 and 74, upwardly through the well bore to the surface. During this reverse flow, it will thus be seen that the fluid continuously passes down the tool string, but is then diverted to the exterior of the bore at the lower end of the tool, then flows upwardly through the junk basket, and is then returned to the exterior of the tool and passes upwardly through the bore to the surface. A packer 19 of any conventional type will of course be employed upon the sleeve 50 between the latter and the well casing 14 and between the ports 54 and 74 to prevent by-passing of fluid from the ports 54 up the annulus between the tool string and the well bore. This reverse flow of the fluid causes the same to enter the lower end of the junk basket, assisting in carrying into the junk basket junk or other material to be retained therein by the fingers. This flow thus cleanses the junk or other objects being collected by the junk basket, as well as assisting in causing the same to pass into the junk basket, whereby such objects may be readily brought to the surface when the tool string and junk basket are moved upwardly from the well bore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A junk basket comprising a hollow barrel with a smooth, exterior cylindrical surface of uniform diameter throughout its length, said barrel being adapted for attachment to and for communication with a tool string for receiving drilling fluid therefrom, said barrel having means including an open lower end continuously in unobstructed direct communication with the well bore surrounding said barrel, said barrel having upon its exterior a diametrically reduced intermediate portion with longitudinally extending circumferentially spaced grooves therein, a sleeve on said barrel secured to and enclosing said diametrically reduced portion and defining with said grooves reverse flow inlet passages, said passages having inlet ports at their upper ends communicating with the interior of said barrel and having outlet ports at their lower ends opening through said sleeve to the exterior of said barrel, a valve body slidable in said barrel between an upper normal circulation position and a lower reverse circulation position, said valve body having a passage therethrough, a valve seat in said valve body at the upper end of said valve body passage, yieldable means engaging said valve body and barrel and releasably retaining said valve body in said upper position, said valve body having its lower portion of a diameter corresponding to that of the interior of said barrel for closing said inlet ports and having its upper portion disposed opposite said inlet ports and of reduced diameter thereby providing a clearance for opening said inlet ports, said barrel and said valve body having reverse flow outlet passages disposed for registration when said valve body is in said lower position, said outlet passages in said valve body having continuous communication with said first mentioned valve body passage, said valve seat being of such size as to be engaged by a ball valve member applied thereto through said tool string to close said valve body passage and a retainer in said barrel.

2. The combination of claim 1 including a connector secured to and closing the upper end of said barrel for securing the latter to and communicating the interior of the latter with said tool string, said connector having a bore therethrough provided with an enlarged portion directly communicating with the interior of said barrel, said valve body having its upper portion slidably and guidingly receivable in fluid tight engagement in said enlarged portion when the valve body is in said upper position and being removed from said enlarged portion during travel of the valve body from its upper to its lower position.

3. The combination of claim 2 wherein said reduced upper portion of said valve body is of such length and said inlet ports of said reverse flow inlet passages are so placed that said reduced upper portion will uncover said inlet ports after said upper portion is withdrawn from said enlarged portion and before said reverse flow outlet passages of said barrel and valve body are moved into registration.

4. The combination of claim 1 including a combined guide and stop means connected to said valve body and said barrel, said stop means including longitudinally extending channels in the exterior surface of said valve body and pins carried by and extending through said barrel and slidably received in said channels whereby to limit sliding movement and prevent rotation of said valve body in said barrel.

5. The combination of claim 4 wherein said pins extend through said sleeve to the exterior thereof.

6. The combination of claim 1 wherein said yieldable means comprises a shear pin extending through said sleeve and barrel and engaged in a bore in said valve body.

7. The combination of claim 1 wherein said retainer comprises a junk chamber in said barrel between said valve body and said open lower end in continuous unobstructed communication with the passage through said valve body and with said open end.

8. The combination of claim 7 wherein said junk chamber includes a sleeve-like casing having an opening therethrough registering with and of the same internal diameter as that of the opening through said barrel, catcher fingers pivoted to the wall of said junk chamber and disposed within said junk chamber for admitting junk into said junk chamber from said open end of said barrel and retaining said junk.

9. The combination of claim 8 wherein said junk chamber wall has longitudinal recesses therein, said fingers being pivoted in said recesses and being foldable into said recesses whereby to prevent said fingers from obstructing passage of a core or junk into said junk chamber.

10. The combination of claim 1 wherein said retainer comprises a junk chamber in said barrel between said valve body and said open lower end in continuous unobstructed communication with the passage through said valve body and with said open end, said junk chamber comprising a sleeve-like casing having a central opening therethrough registering with and of the same internal diameter as that of the opening through said barrel, said barrel having detachable top and bottom portions, and said casing and bottom portion having complementary engaging shouldered surfaces, said top portion engaging said casing and clamping it to said shouldered surface in said bottom portion.

11. The combination of claim 10 wherein said bottom portion has an annular groove in its internal wall below said junk chamber, an annular radially resilient core slip in said groove, said groove and slip having complementary downwardly convergent tapered surfaces whereby downward movement of said slip in said groove will radially contract said annular slip.

12. The combination of claim 11 wherein said annular slip comprises a split ring inherently normally biased for radial expansion.

References Cited in the file of this patent

UNITED STATES PATENTS

| | | |
|---|---|---|
| 1,720,700 | Stone | July 16, 1929 |
| 2,617,486 | Davis | Nov. 11, 1952 |
| 2,638,988 | Williams | May 19, 1953 |
| 2,663,370 | Donnell et al. | Dec. 22, 1953 |
| 2,675,879 | Middleton et al. | Apr. 20, 1954 |
| 2,701,019 | Steed | Feb. 1, 1955 |
| 2,787,327 | Pearson | Apr. 2, 1957 |